(12) United States Patent
Jenkins et al.

(10) Patent No.: US 8,195,088 B2
(45) Date of Patent: Jun. 5, 2012

(54) METHOD AND APPARATUS PERTAINING TO WIRELESS COMMUNICATIONS SYSTEMS

(75) Inventors: Jeremy E. Jenkins, Bartlett, IL (US);
Robert R. Keller, Jr., Park Ridge, IL (US); Robert S. Study, III, Arlington Heights, IL (US); Madhurima Thevanathan, Aurora, IL (US); Hamin Tien, Hoffman Estates, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 199 days.

(21) Appl. No.: 12/717,883

(22) Filed: Mar. 4, 2010

(65) Prior Publication Data

US 2011/0217920 A1    Sep. 8, 2011

(51) Int. Cl.
*H04B 3/36* (2006.01)
*H04B 7/14* (2006.01)

(52) U.S. Cl. .......... 455/7; 455/11.1; 455/450; 455/13.1; 370/315; 370/279; 370/316

(58) Field of Classification Search ............... 455/456.1, 455/450, 420, 23, 11.1, 8, 509, 7, 24, 12.1, 455/13.1, 422.1, 13.4, 16; 370/315, 210, 370/279, 322, 328, 316, 252, 280
See application file for complete search history.

(56) References Cited

U.S. PATENT DOCUMENTS

| 5,734,982 A * | 3/1998 | Endo et al. ............... 455/450 |
| 6,625,140 B1 * | 9/2003 | Kamimura ............... 370/352 |
| 2004/0185844 A1* | 9/2004 | Neuman ............... 455/420 |
| 2005/0163506 A1* | 7/2005 | Ikeda et al. ............... 398/41 |
| 2008/0096577 A1* | 4/2008 | Attali et al. ............... 455/456.1 |

* cited by examiner

*Primary Examiner* — Sujatha Sharma
(74) *Attorney, Agent, or Firm* — Fitch Even Tabin & Flannery LLP (57) ABSTRACT

A pool of identifiers are individually used by corresponding particular ones of a repeaters. A communications protocol as used by the repeaters provides time slots to be used by these repeaters when making their transmissions. Each of the time slots is associated with individual corresponding ones of the identifiers, though the time slots are allocated unequally amongst the identifiers such that at least one of the identifiers has more time slots allocated to that identifier, over a given beacon cycle, than others of the identifiers.

18 Claims, 8 Drawing Sheets

METHOD AND APPARATUS PERTAINING TO WIRELESS COMMUNICATIONS SYSTEMS

RELATED APPLICATION(S)

This application is related to co-owned U.S. patent application Ser. No. 12/717,873, entitled Facilitating Asynchronous Transmissions Using A Protocol Having Asynchronous And Synchronous Portions and filed on even date herewith, which is incorporated by reference in its entirety herein.

TECHNICAL FIELD

This invention relates generally to wireless communications and more particularly to wireless data transmissions.

BACKGROUND

Wireless communications comprises a well-understood area of endeavor. Generally speaking, wireless communications permit information to be provided from one location to another, electronically, without a physically-visible path such as a metal wire, optical fiber, or the like. Known areas of practice include repeater-based systems, the sharing of a limited bandwidth amongst a relatively large user base, frequency-hopping systems, and more. These known approaches, in turn, often serve well in a variety of application settings.

These known approaches, however, do not necessarily satisfactorily meet the needs and requirements of all application settings, however. A modern self-storage facility constitutes one such example in these regards. Such facilities are increasingly designed to require few, if any, human attendants. This leads to increasing reliance upon automated and/or remotely controllable access-control mechanisms, lighting, security mechanisms, safety mechanisms, and so forth. At the same time, however, fixed and operating costs must typically meet stringent requirements that are anything but generous. This tends to prompt the use of wireless links to support such an infrastructure to thereby avoid the need to install and maintain a complicated hard-wired data network to support the hundreds or even thousands of devices that represent the communicative edges of such a network. (These network devices at the outer edge of the network's communication links are referred to herein as "edge devices.")

Using wireless edge devices can avoid the need for a hard-wired data network, but such devices obviously need electrical power and the similar wish to avoid an expensive hard-wired power-distribution backbone can urge the designer towards battery-powered devices. Here, however, a serious conundrum presents itself. If the battery life for the hundreds or thousands of edge devices at a self-service storage facility is too brief, the corresponding need to frequently service those devices to exchange batteries can defeat hoped-for gains. But if the edge devices are unable to wirelessly communicate properly due to a wish to avoid drawing down those batteries too quickly, their underlying functionality and raison d'être can be undercut to the point of rendering the system unfit for its intended purpose.

BRIEF DESCRIPTION OF THE DRAWINGS

The above needs are at least partially met through provision of the method and apparatus pertaining to wireless communications systems described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, these various embodiments facilitate repeating messages in a wireless communication system when repeaters are present. Generally speaking, these teachings provide for a pool of identifiers which are then individually used by corresponding particular ones of the repeaters. A communications protocol as used by the repeaters provides time slots to be used by these repeaters when making their transmissions. Each of the time slots is associated with individual corresponding ones of the identifiers, though the time slots are allocated unequally amongst the identifiers such that at least one of the identifiers has more time slots allocated to that identifier, over a given beacon cycle, than others of the identifiers.

By one approach, and presuming there are X repeaters, the protocol establishes a given sub-sequence of X time slots that are equally distributed amongst the maximum number of repeaters. This protocol then also establishes at least one additional sub-sequence of X time slots (which may overlap with the given sub-sequence by, for example, one time slot) and which comprise a reversal of the given sub-sequence. By adopting and leveraging such an approach, it becomes possible to reasonably ensure that a given message can be conveyed via a full allotment of repeaters from a source to an intended destination within a single frame of the protocol.

As alluded to earlier, these teachings are particularly useful when employed in the context of a self-storage facility. Although these teachings are not limited in these regards, for the sake of illustration the examples provided herein will presume such an application setting. Accordingly, prior to presenting details as pertain specifically to these teachings, it may be helpful to first briefly describe and characterize an illustrative self-storage facility.

A self-storage facility typically comprises a plurality of individual self-storage units. As a specific non-limiting example, a self-storage facility might comprise six separate buildings that each contain, for example, twenty-five such self-storage units. Each of the self-storage units is physically separated from adjacent units by the use of walls and ceilings. A movable barrier provides individual access to each self-storage unit. Each such barrier, in turn, accommodates a corresponding end-user controlled lock. These can include, for example, key-operated and combination-based locks as are known in the art. This lock often also comprises an over-lock mechanism that is controllable by the self-storage facility. Such overlocks are known in the art and include remotely-controlled electrically-operated locking and unlocking mechanisms.

Such a self-storage facility also typically includes a perimeter barrier such as a fence. This perimeter barrier will usually include at least one (and often only one) point of access. This point of access will often comprise an automatically controlled sliding gate that responds to an access-control mechanism of choice. By one typical approach, for example, the access-control mechanism comprises a keypad that the end user employs to enter an entry code. Correct entry of this entry code, in turn, causes the access-control mechanism to instigate moving the gate and hence permitting the end user to enter the premises.

A typical self-storage facility will also usually include electric lighting. This often at least includes security lighting (where "security lighting" will be understood to refer to lighting that serves, at least primarily, to provide illumination in a manner that will tend to deter unauthorized individuals from occupying the illuminated space in order to avoid having their unauthorized presence noted by an observer). Such security lighting is often located near the periphery of the self-storage facility as well as at appropriate locations within the facility. A given facility will also often including other kinds of lighting including but not limited to workspace lighting (to provide helpful illumination to authorized end users who are there to locate their units, to place items in or to remove items from their units, to inspect the contents of their units, and so forth), illuminated signage, illuminated instructions (such as EXIT signs), and so forth.

A typical self-storage facility also often includes an office. This office serves as a workplace for one or more authorized representatives of the self-storage facility. Such persons are often there to interact with existing end users (by, for example, accepting monthly rental payments, addressing access problems, and so forth) and potential new end users (by, for example, having new end users sign rental agreements), to monitor the security of the premises (by, for example, making personal inspections, observing closed circuit video feeds that provide views of various locations within the facility, and so forth), and so forth.

Increasingly, many self-storage facilities deploy sensors of various kinds to detect one or more conditions or states of interest. Examples include, but are certainly not limited to, barrier position detectors, smoke detectors, heat detectors, movement detectors, light detectors, airborne toxic materials detectors, ionizing radiation detectors, biological materials detectors, and so forth.

Figure 1:
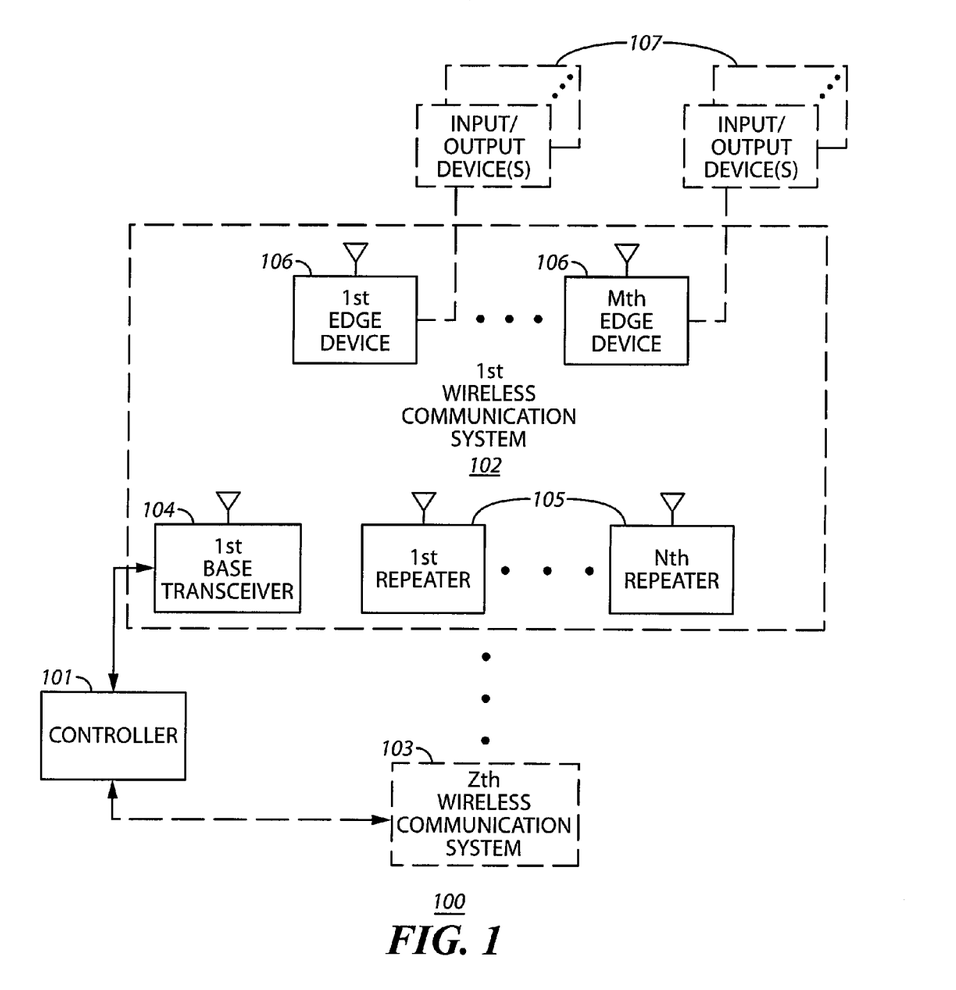
FIG. 1 comprises a block diagram as configured in accordance with various embodiments of the invention.

Referring now to the drawings, FIG. 1 presents an illustrative representation of a wireless communications network 100 suitable for deployment in such an application setting. This network 100 includes a controller 101 that can be housed, for example, in or near the aforementioned office and which may comprise one or more computers such as a personal computer. If desired, of course, this controller 101 can be located elsewhere, either within the facility or remotely. By one approach, for example, the controller 101 (or a portion thereof) can be located at another physically discrete facility elsewhere in the same town or essentially anywhere else that may be geographically convenient to the governing administration. Generally speaking, this controller 101 serves to monitor various operating states of the facility and to source any of a variety of corresponding commands.

The controller 101 operably couples (for example, via a non-wireless connection that relies upon one or more electrical conductors, optical fiber, or the like) to at least a first wireless communication system 102. By one approach, if desired, this network 100 can accommodate a plurality of such wireless communication systems as denoted here by an optional Zth wireless communication system 103 (where "Z" can comprise an integer such as, for example, "4"). When employing a plurality of wireless communication systems at a given self-storage facility, these systems can be operationally similar and hence a description here of one will serve as a description for each.

The first wireless communication system 102 has a corresponding first base transceiver 104. This first base transceiver 104 operably couples to the aforementioned controller 101 and exchanges information and instructions therewith. This first base transceiver 104 can comprise, for example, a frequency-hopping half-duplex transceiver having a range of, say, up to two thousand feet.

This first wireless communication system 102 also optionally has one or more repeaters 105 to extend the coverage of this system 102. Here, for the sake of example and without intending any limitations in these regards, it will be presumed that each wireless communication system can operationally accommodate up to four such repeaters 105 (and hence "N" in the illustration represents the integer "4"). Generally speaking, these repeaters 105 serve to receive transmissions within the system 102 and to retransmit at least portions of those transmissions.

Further details in these regards appear below where relevant.

Lastly, the wireless communication system 102 includes one or more edge devices 106 (represented here by a first through an Mth device, where "M" is an integer greater than 1). In this particular illustrative example, and again without intending to suggest specific limitations in these regards, each wireless communication system will accommodate up to 2,040 edge devices. Accordingly, and again presuming that the network 100 can accommodate up to four such systems, the network 100 will accommodate over eight thousand edge devices. This, in turn, will tend to ensure adequate service and capacity for most if not all self-storage facilities. To the extent that a greater number of edge devices require accommodation, these teachings are readily scaled to comfortably extend capacity as desired.

Figure 2:
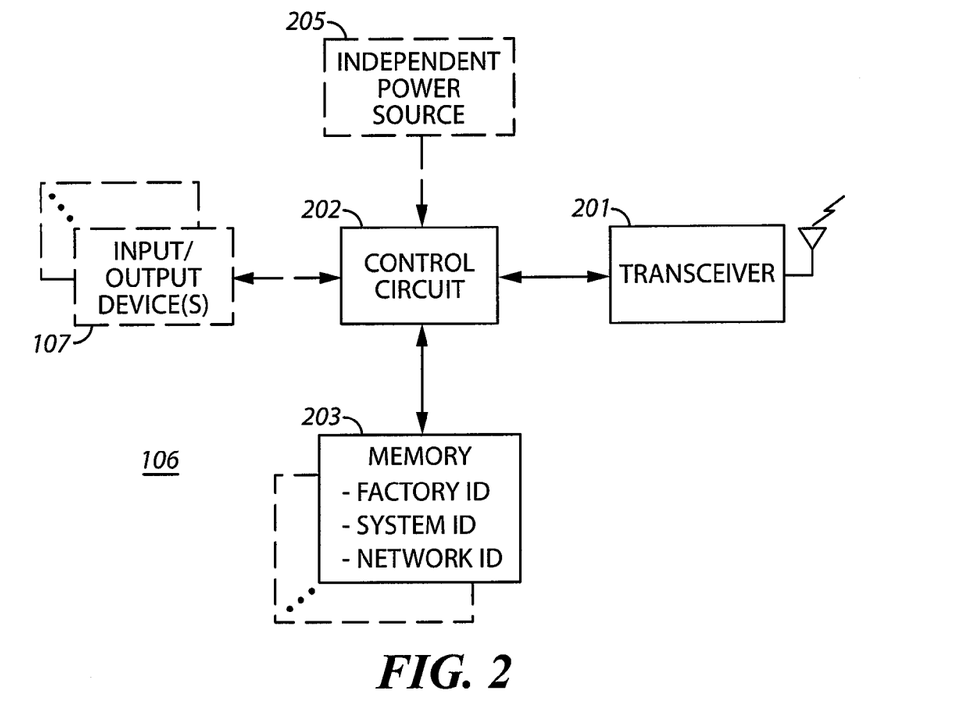
FIG. 2 comprises a block diagram as configured in accordance with various embodiments of the invention.

Referring now to FIG. 2, these edge devices 106 can comprise a transceiver 201 that is configured to operate to compatibly source and receive wireless transmissions to and with the aforementioned base transceiver 104 (either directly and/or via the aforementioned repeaters 105). Accordingly, for example, when the base transceiver 104 comprises a frequency-hopping transceiver, the edge device's transceiver 201 will similarly comprise a compatible frequency-hopping transceiver. By one approach, these edge device transceivers 201 can transmit using a same transmit power level as, say, the aforementioned repeaters.

This transceiver 201 operably couples to a control circuit 202. This control circuit 202 can comprise a fixed-purpose hard-wired platform or can comprise a partially or wholly programmable platform. Such architectural options are well known and understood in the art and require no further description here. Generally speaking, this control circuit 202 is configured (using, for example, corresponding programming as will be well understood by those skilled in the art) to carry out one or more of the steps, actions, and/or functions described herein. This can include controlling the reception and/or transmission activity of the transceiver 201.

This control circuit 202 in turn operably couples to a memory 203. When the control circuit 202 comprises a programmable platform, this memory 203 can store, in whole or in part, the instructions that the control circuit 202 executes to carry out the described activities. This memory 203 can also serve to store one or more identifiers (ID's). For example, each edge device 106 can have a unique factory ID assigned thereto and stored in this memory 203. For the sake of illustration and without any intention to suggest a limitation in these regards, it will be presumed here that this factory ID comprises a 32-bit word.

This unique factory ID serves, at least in part, to permit the base transceiver 104 (and/or the controller 101) to differentiate the various edge devices 106 from one another. As the factory ID must necessarily comprise a large number in order to permit differentiation amongst perhaps millions of edge devices, the factory ID will consume a correspondingly large amount of wireless signaling capacity. As each wireless communication system will typically accommodate only a relatively small number of edge devices 106 (as compared to all edge devices as may ultimately be manufactured), these teachings will accommodate assigning and using a local system ID that can be used as an alias to locally uniquely identify each and every edge device. This system ID might comprise, for example, an 11-bit word.

Figure 3:
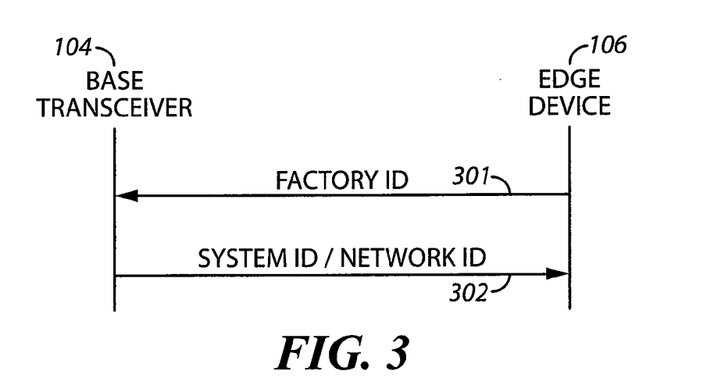
FIG. 3 comprises a signal flow diagram as configured in accordance with various embodiments of the invention.

There are various ways by which a given edge device 106 might be uniquely associated with a particular system ID. With momentarily reference to FIG. 3, and again without intending limitations in these regards, a given edge device 106 can transmit a message 301 to the base transceiver 104 (either directly or via the aforementioned repeaters 105) to present its factory ID when first becoming affiliated with a given wireless communication system. The base transceiver 104 (and/or the controller 101) can then correlate that factory ID with a particular system ID that is uniquely assigned within the wireless communication system to this particular edge device 106. This system ID is then transmitted by the base transceiver 104 in a corresponding message 302 to the edge device which then stores that system ID in the aforementioned memory 203 for subsequent use.

By one approach, each wireless communications system may utilize a same (or overlapping) set of system ID's. In cases where a given network 100 employs two or more such systems, or where two or more networks serving different facilities happen to overlap in coverage with one another, this can lead to situations where a same system ID is utilized in different overlapping systems for different edge devices. To ameliorate such a circumstance, these teachings will also accommodate using a network ID. Where, as in this illustrative example, a single controller 101 will accommodate up to four systems, this network ID can comprise a 2-bit word. In such a case, the base transceiver 104 can include this network ID in the aforementioned message 302 and the corresponding edge device 106 can again store that network ID in the aforementioned memory 203 for subsequent usage.

There are other possible ways to accomplish the foregoing if desired. As one example, an edge device 106 can suggest a possible system ID to the base transceiver 104. The base transceiver 104 can confirm that selection when the proposed system ID is in fact available. When that proposed system ID is already in use, the base transceiver 104 can deny the suggestion and the edge device 106 can suggest another (or accept and utilize a system ID that the base transceiver 104 might itself suggest/assign by way of response).

Referring again to FIG. 2, a given edge device 106 will typically either connect to, or integrally comprise, one or more input/output devices 107. Examples in these regards include, but are not limited to, lock and/or overlock actuation mechanisms (to selectively remotely lock and/or unlock a corresponding lock at a point of general access and/or as pertain to individual storage units), lighting controls, video and/or audio surveillance controls, and any of a variety of sensors. Generally speaking, the edge device 106 serves to transmit (via the transceiver 201) operating state information regarding these input/output devices 107 (such as the locked/unlocked state of a lock) and/or to apply received commands to these input/output devices (107) (such as a command to lock or unlock a lock).

It is possible for such an edge device 106 to receive an externally-provided source of electric power (for example, by connecting to an alternating current mains or to a 48 volt direct current source of power). For many application settings, however, such an approach represents a costly and inflexible strategy. Instead, it may be often preferred to employ an independent power source 205 such as one or more batteries. Such an approach will tend to afford greater cost-effective flexibility with respect to initial installation as well as later reconfigurations.

Figure 4:
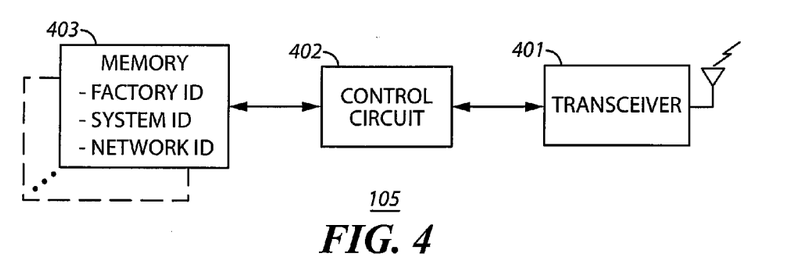
FIG. 4 comprises a block diagram as configured in accordance with various embodiments of the invention.

Before proceeding further with this description, it may be helpful to first also briefly describe an illustrative embodiment for the aforementioned repeaters 105. Referring to FIG. 4, each repeater 105 can comprise a transceiver 401 that operably couples to and is controlled by a corresponding control circuit 402. This transceiver 401 again comprises a wireless platform that operates compatibly within the radio frequency context of the system. Given that there are relatively few repeaters 105 in a given deployment setting as compared to edge devices 106, and given the typically-higher power-consumption requirements over time of such an element (as these repeaters are typically constantly "on"), the repeaters 105 will typically connect to an external power source (not shown).

The control circuit 402 can again comprise a hard-wired platform or a partially or wholly programmable platform as desired. As with the edge device 106, this control circuit 402 is configured (for example, via programming) to carry out one or more of the steps, actions, and/or functions described herein. In these regards (but without intending any corresponding limitations) the control circuit 402 also operably couples to a memory 403. In addition to storing whatever executable instructions the control circuit 402 might need, this memory 403 can also store a factory ID and/or a system ID/network ID as described above. System ID's and/or network ID's can be correlated to given repeaters 105 as described above with respect to FIG. 3 if desired.

As noted earlier, the edge devices 106 can be powered by stand-alone power sources such as batteries. Accordingly, if the power-consumption requirements of the edge devices 106 are too high, these stand-alone power sources will drain quickly. This, in turn, will require frequent installation of fresh batteries. When necessitating such a requirement over hundreds or thousands of edge devices 106, the corresponding manpower requirements can offset the hoped-for reductions in manpower that otherwise attend the deployment of such a system. Accordingly, these teachings will accommodate use of a communications protocol designed to serve the operating needs of such a system while simultaneously reducing the power-consumption requirements of the edge devices 106.

A number of approaches in these regards will now be described. It will be understood that the specifics of these examples serve an illustrative purpose and should not be taken as being exhaustive in these regards.

Figure 5:
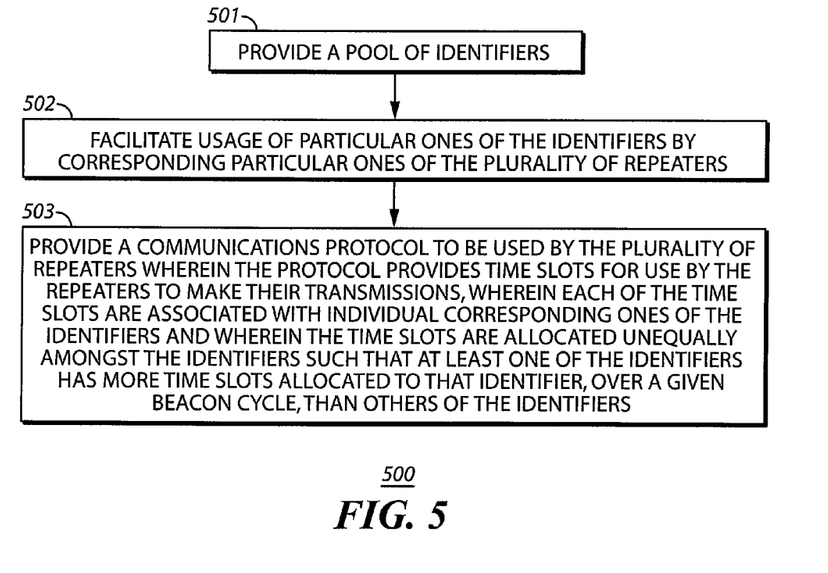
FIG. 5 comprises a flow diagram as configured in accordance with various embodiments of the invention.

With those caveats in place, and referring now to FIG. 5, this process 500 provides for the step 501 of providing a pool of identifiers. These identifiers refer, in this specific example, to the pool of identifiers that are used as system ID's for the aforementioned repeaters 105. Since the present example presumes to accommodate up to four repeaters 105, this pool of identifiers can comprise a pool of four discrete numbers. These can be, for example, the numbers 0, 1, 2, and 3 (as these numbers are easily and directly represented by the bit pairs 00, 01, 10, and 11, respectively).

Figure 6:
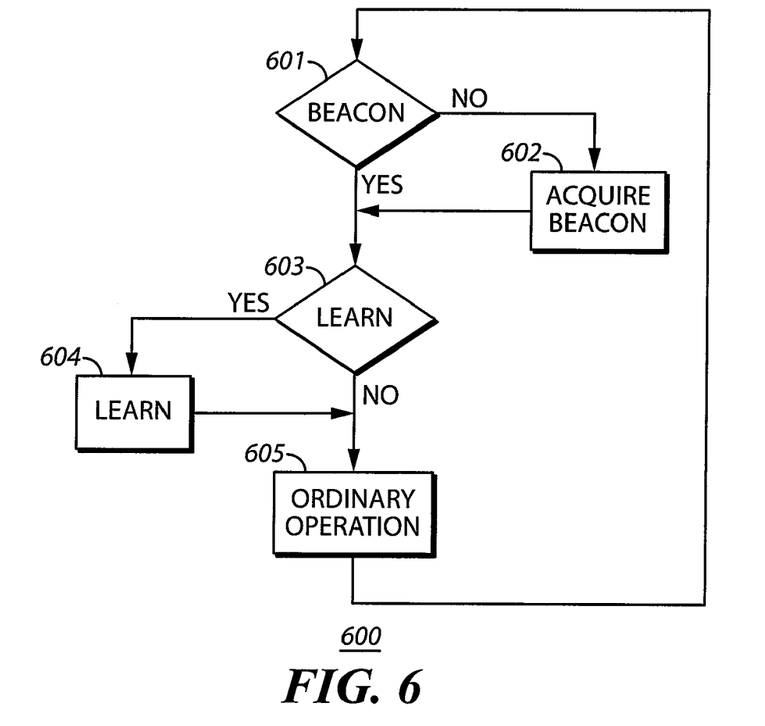
FIG. 6 comprises a flow diagram as configured in accordance with various embodiments of the invention.

At step 502, this process 500 then provides for facilitating usage of particular ones of these identifiers by corresponding particular ones of the plurality of repeaters. Referring momentarily to FIG. 6, one approach 600 in these regards will be described. (This approach 600 presumes a beacon-based protocol. The present description will provide further exemplifying details in these regards further below.)

At step 601, the repeater determines whether it is receiving the beacon signal as sourced by a particular base transceiver for a particular wireless communication system. If not, the repeater utilizes a beacon acquisition process 602 to acquire such a beacon. Upon successfully locating such a beacon, this approach 600 then provides a step 603 to determine whether the repeater needs to "learn" its respective place within the corresponding wireless communication system. If true, at step 604 the repeater uses a learn process to, for example, receive a particular one of the aforementioned identifiers from the pool of identifiers. (As disclosed above, this learn activity can also include receiving a network ID that identifies the particular wireless communication system being serviced by this particular based transceiver.) At step 605 the repeater can then carry on with its ordinary operation using its system ID (and network ID where relevant).

Referring again to FIG. 5, at step 503 this process 500 provides a communications protocol to be used by the one or more repeaters (and, if desired, the edge devices as well). In this example, this protocol provides time slots for use by the repeaters when making their transmissions. Each of these time slots are associated, in turn, with individual corresponding ones of the aforementioned system ID's. Accordingly, a time slot that is associated with ID "2" is essentially reserved for transmission use by the repeater that is also associated with ID "2" to the exclusion of the other repeaters.

Figure 7:
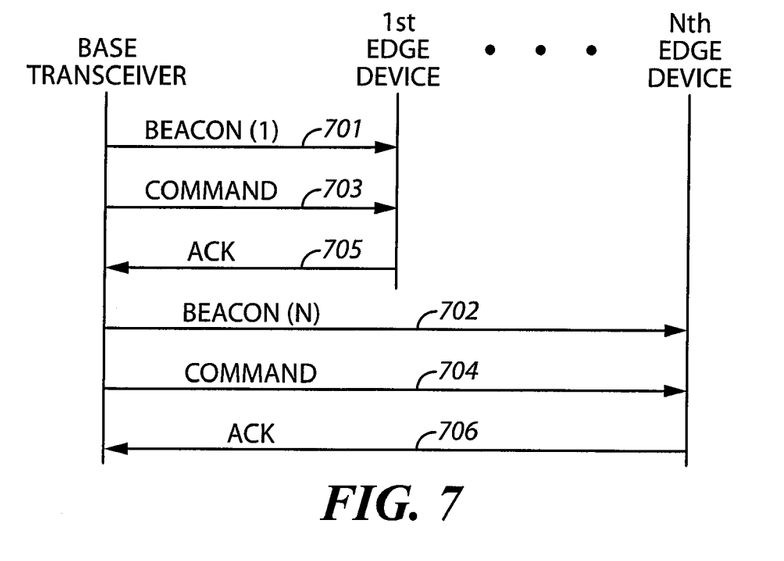
FIG. 7 comprises a signal flow diagram as configured in accordance with various embodiments of the invention.

With momentary reference to FIG. 7, this illustrative protocol presumes an ongoing sequence of beacon cycles. Generally speaking, each such cycle includes at least one source transmission of a beacon message by the base transceiver followed by a command window and an acknowledgement window. The beacon message occurs on a predictable periodic basis and can include a system ID for a particular edge device. In the example shown, a first such beacon message 701 identifies system ID "1" while a second such beacon message 702 identifies system ID "N."

The base transceiver then follows that beacon message with a command message intended for the previously identified edge device. In the example shown, then, the first beacon message 701 is followed by a command message 703 intended for the first edge device while the second beacon message 702 is followed by a command message 704 intended for the Nth edge device. This might be a command, for example, to report the "locked" or "unlocked" state of a lock as corresponds to those particular edge devices.

The identified edge devices then use a corresponding acknowledgement message opportunity to respond to the base transceiver with the requested information. Accordingly, in the example shown, the first edge device provides its response in the acknowledgement message 705 that comprises a part of the first illustrated beacon cycle while the Nth edge device provides its response in the acknowledgement message 706 that comprises a part of the second illustrated beacon cycle.

Figure 8:
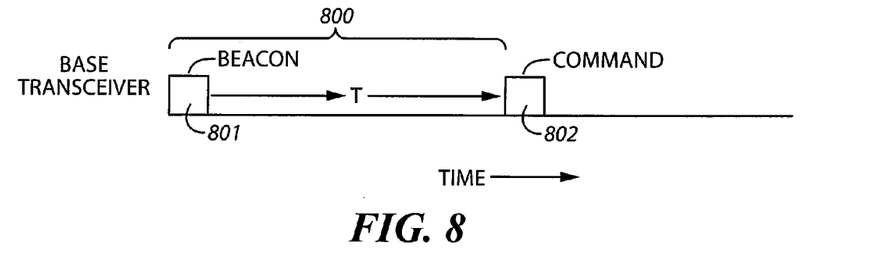
FIG. 8 comprises a schematic timing diagram as configured in accordance with various embodiments of the invention.

The illustration of FIG. 7 does not depict the presence or use of the aforementioned repeaters, but indeed such network elements may be utilized to effect the transport of these messages in a given application setting. Accordingly, this illustrative communications protocol provides time for repeated transmissions. FIG. 8 illustrates this point in a general way. Here, it can be seen that a beacon transmission 801 from the base transceiver it not followed immediately by the corresponding command transmission 802. Instead, the base transceiver is quiet for a duration of time "T." For the sake of illustration and not by way of limitation, it will be presumed here that the duration of the payload message (i.e., the beacon, command, and acknowledgement messages) is about 2.99 milliseconds while the duration of the entire frame 800 (i.e., the time from the beginning of sending the beacon message 801 to just before the beginning of the command message 802) is about 50.8 milliseconds. In such a case, "T" equals about 47.84 milliseconds and hence represents a considerable amount of time to accommodate potential repeater activity.

Figure 9:
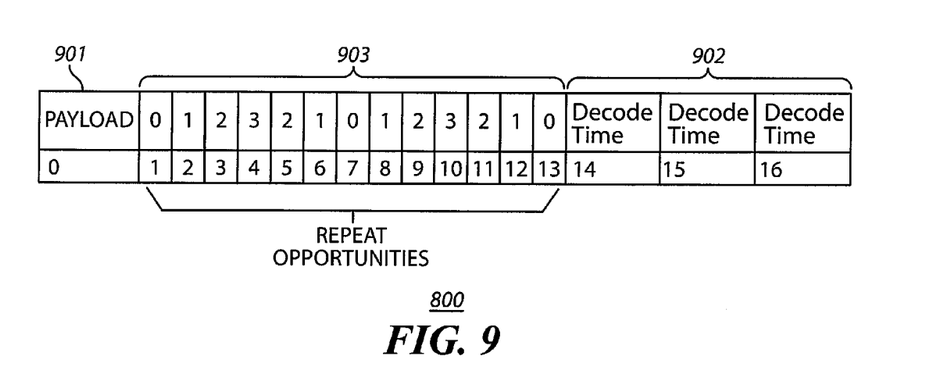
FIG. 9 comprises a schematic frame diagram as configured in accordance with various embodiments of the invention.

This illustrative protocol, however, does better than merely "accommodate" potential repeater activity and instead is well calculated to tend to ensure that a given synchronous payload transmission (as sourced by either the base transceiver or an edge device) will reach its intended destination within a single such frame 800. Referring now to FIG. 9, further details in these regards will be provided.

As shown, each such frame 800 (i.e., the beacon frame, command frame, and acknowledgement frame) comprises a plurality of seventeen time slots (each being the aforementioned 2.99 milliseconds in duration). The first slot (slot "0") 901 carries the original payload for the frame (such as the beacon message, the command message, or the acknowledgement message). This first slot 901 can also serve to indicate the number of times the payload has been repeated if desired.

The final three slots 902 provide decoding time for the recipient.

The intervening thirteen slots 903 comprise slots 1 through 13. These are the slots that are reserved, via the protocol, for use by the repeaters (if any) when making their repeated transmissions. In this illustrated example, each such repeater slot 903 is assigned to one, and only one, of the potential repeaters that can be accommodated by a given wireless communication system. Here, the slot assignments reflect that there no more than four repeaters accommodated by a given wireless communication system.

Accordingly, these thirteen repeater slots 903 are assigned to the system ID sequence shown: 0-1-2-3-2-1-0-1-2-3-2-1-0. This means that the repeater having system ID "0" can transmit in any of slots 1, 7, and 13 while the repeater having system ID "1" can transmit in any of slots 2, 6, 8, and 12. Accordingly, it can be seen that these time slots are allocated unequally amongst these identifiers. In particular, at least one of the identifiers has more allocated time slots (over a given frame and also over a given beacon cycle) than others of the identifiers. For example, system ID "3" has only two slots correlated thereto while system ID "0" has three slots and system ID slots "1" and "2" each have four slots allocated thereto.

As another possibly useful way of looking at this configuration, the first four slots (i.e., slots 1-4) comprise a first sub-sequence of time slots that forms a corresponding forward-ordered progression of time slots as considered from the standpoint of their non-repeating corresponding identifiers (i.e., 0 to 1 to 2 to 3). Similarly, time slots 4 through 7 comprise an additional sub-sequence of four time slots that overlaps by one time slot (i.e., time slot 4) with the first noted sub-sequence. In this case, however, this additional sub-sequence forms a reversal of the progression described above for the first four time slots (i.e., the identifiers now descend from 3 to 2 to 1 to 0).

In this particular illustrative example, a third similarly-overlapping sub-sequence of time slots (representing another forward-ordered progression) is provided followed by a concluding overlapping sub-sequence of time slots (representing another reversal of the forward-ordered progression).

Such an unequal distribution of transmitting opportunities may be surprising to those who are skilled in the art. To provide an equal number of slots for all of the ID's, however, would require sixteen time slots. Generally speaking, the fewer the number of time slots, the better. The particular sequence shown provides the surprising benefit of tending to ensure that a message will reach its destination within a single frame notwithstanding an unknown possible number of repeaters (within the anticipated maximum number of repeaters) and not withstanding a lack of knowledge regarding the order in which a given set of repeaters must sequentially repeat a given transmission in order to reach that destination.

Figure 10:
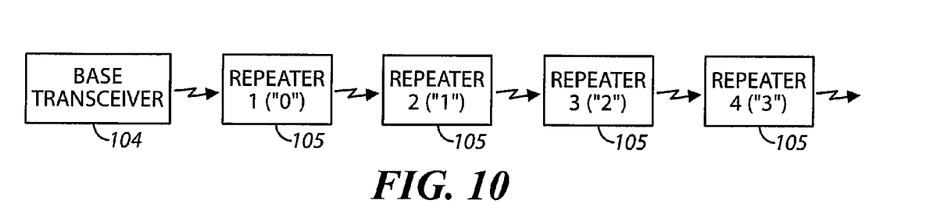
FIG. 10 comprises a block diagram as configured in accordance with various embodiments of the invention.

Consider a first example in these regards. As shown in FIG. 10, by one physical configuration a transmission from the base transceiver 104 may have to pass through repeater 1, repeater 2, repeater 3, and repeater 4 in that particular sequence in order to reach a destination edge device. In this example, repeater 1 has been assigned system ID "0," repeater 2 has been assigned system ID "1," repeater 3 has been assigned system ID "2," and repeater 4 has been assigned system ID "3" as per, for example, the system-ID assignment process described above.

Figure 11:
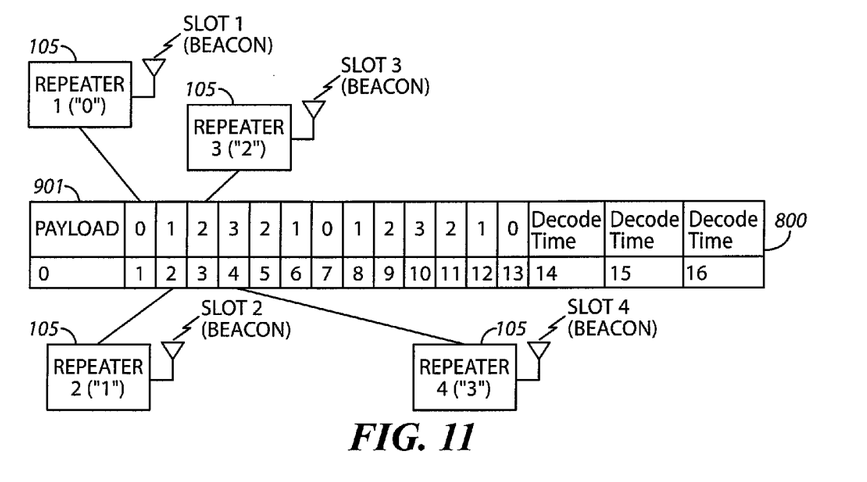
FIG. 11 comprises a schematic frame diagram as configured in accordance with various embodiments of the invention.

As shown in FIG. 11, a payload 901 as transmitted in a given frame 800 by the base transceiver, which must be first repeated by repeater 1, will be repeated by transmitter in time slot 1 which is, in fact, allocated for use by this repeater. The next repeater in the sequence, repeater 2, will then repeat the payload in a transmission that utilizes time slot 2 which is, again, allocated for use by this repeater as per the system ID-based protocol. Quite similarly, repeater 3 then utilizes time slot 3 and repeater 4 utilizes time slot 4 to ultimately deliver the payload 901 message to the intended edge device.

It may be noted that neither the repeaters nor the base transceiver are actually aware that this particular sequence of transmissions happens to be the sequence that leads to this particular edge device. Instead, this just happens to be the case. In fact, using this protocol, this sequence of repetitions will occur regardless of which repeater might in fact reach a desired intended message recipient (and even regardless of whether any repeater is required at all to reach a particular edge device).

By one approach, each repeater can be configured to repeat a transmission only once in each such frame. Accordingly, repeater 1, having made a transmission in slot 1, will not make another transmission during this frame 800 regardless of whether other transmissions happen to be received during the frame 800.

In any event, in this example, the system will be essentially quiescent for the remainder of the frame 800 for time slot 5 and beyond, as all of the repeaters will have made their retransmissions and the corresponding follow-up source transmissions are not expected until the following frame.

Figure 12:
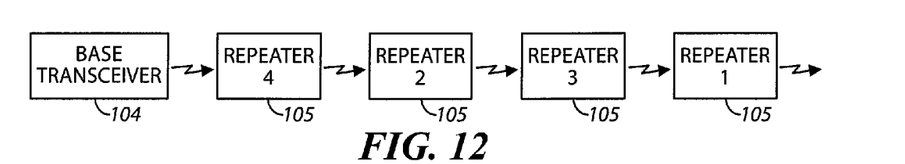
FIG. 12 comprises a block diagram as configured in accordance with various embodiments of the invention.

Turning now to FIG. 12, consider another example in these regards. Here, the physical order for the repeaters is different than that just presented. Instead, the transmissions of the base transceiver 104 are first received and repeated by repeater 4, then repeater 2, then repeater 3, and finally repeater 1. Again, this sequence is not necessarily known a priori to the base transceiver 104 nor is this important.

Figure 13:
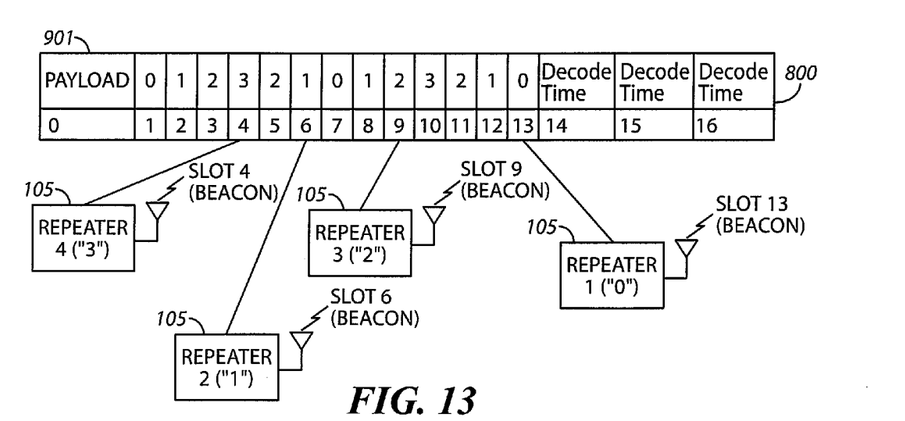
FIG. 13 comprises a schematic frame diagram as configured in accordance with various embodiments of the invention.

In such an application setting, and referring now to FIG. 13, the first repeater to make a repeated transmission, repeater 4, transmits in its first opportunity which happens to be time slot 4. The next repeater in the physical sequence, repeater 2, will then transmit using its first opportunity, which is time slot 6. This will be followed by repeater 3's use of time slot 9 and finally by repeater 1's used of time slot 13.

It will be seen that any physical sequence of these four repeaters can be fully accommodated by this sequence of thirteen time slots such that an original source transmission can reach its destination within a single frame regardless of the number of repetitions that may be necessary to effect this result and notwithstanding the noted disparity regarding the inequality of time slot assignments to the various available repeater identifiers.

Figure 14:
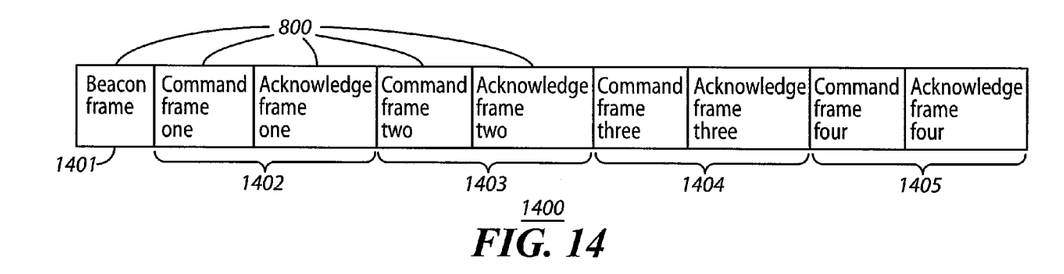
FIG. 14 comprises a schematic frame diagram as configured in accordance with various embodiments of the invention.

In the above examples, a command frame and acknowledgement frame follow a beacon frame. By one approach, a given beacon cycle can accommodate a plurality of such command/acknowledgement frame pairs. FIG. 14 illustrates such an approach. In this example, an original beacon frame 1401 as described above is followed by a first command/acknowledgement frame pair 1402 as described above and then by three additional such command/acknowledgement frame pairs 1403, 1404, and 1405.

By one approach, such an approach can serve to convey a plurality of different commands to a given intended edge device. For example, the first command frame can inquire of a lock as to its locked status and the next command frame can inquire of the battery status of that lock.

By another approach, these teachings can serve to provide redundancy with respect to the originally transmitted command. Using this approach, the base transceiver will transmit, in each of its command frame opportunities, a same command. This may occur, if desired, regardless of whether the base transceiver receives a response from the recipient edge device during, for example, the first acknowledgement frame.

In the examples provided above, the protocol expects synchronous behavior on the part of the network elements. This synchronicity is keyed to the periodic beacon messages. In particular, this periodic beacon message establishes a point in time against which the various elements of the system can calculate the temporal locations of the various described time slots and frames. As already noted, however, there can be repeaters (as well as edge devices) that are unable to receive the base transceiver's initial transmission of the beacon message. This means that some repeaters and edge devices may inherently receive the beacon message late.

To permit such a repeater (or edge device) to nevertheless temporally synchronize itself with the system, by one approach, the payload portion of the beacon frame can include a count of the number of transmission repetitions that have occurred between the original transmission and the reception of the beacon message. As initially transmitted, this count can be, for example, "0." A receiving element will then know that no temporal adjustments need be made to know the timing relevance of the beacon message. A count of "1," on the other hand, will indicate to the recipient that the timing of the beacon must be adjusted to accommodate the intervening use of a repeater.

Such a count can be simply incremented by the repeater with each transmission. In this illustrative example, however, the number of repetitions does not, by itself, correlate directly to a particular length of delay as the delay will depend as well upon which repeater(s) (and hence which corresponding time slots) have intervened. To address this need, then, the payload can also be updated with each repetition to identify the system ID of the repeater. As each network element is aware of the protocol's assignment of certain repeater ID's to certain time slots, it then becomes a simple matter to calculate the number of time slots that were used to effect the transmission and hence the temporal correction that should be made to the beacon timing to become and to remain temporally synchronized with the system.

Pursuant to the protocol described above, transmissions are all essentially synchronous in that those transmissions are synchronized in time with respect to the transmission of the beacon. This includes the scheduled transmissions of the base transceiver (i.e., the described beacon and commands), the edge devices (i.e., the described acknowledgements), and the repeaters (i.e., their repeated transmissions). Such an approach will generally suffice to attend to the routine polling requirements of the controller (to inventory, for example, operability status of the various edge elements of the system). The applicant has determined, however, that other needs may also require accommodation. In particular, the ad hoc transmission needs of the edge devices.

These transmission needs can pertain, for example, to the unexpected unlocking of a given lock (when, for example, the known storage-space tenant having that lock is not known to be on the premises), the detection of motion by a motion-detection sensor, the detection of smoke by a smoke-detection sensor, the detection of tampering by a tamper-detection sensor, and so forth. Furthermore, in many cases, these ad hoc events may be time sensitive. For example, it may be important to immediately notify the controller regarding a fire or lock tampering rather than awaiting a polling opportunity to reveal such conditions.

To accommodate such a need, the described protocol can further provide an asynchronous portion that follows the described synchronous portion. This asynchronous portion can be viewed as being "asynchronous" in that any of the edge devices are free to source a transmission during this time without regard to any particular schedule or whether that transmission might conflict with another similarly liberated edge device. For an application setting where simultaneous transmissions regarding significant rather than routine states are in fact relatively unlikely (as is typically the case with the described application setting), such an approach is unlikely in practice to be overly burdened by actual collisions. (To accommodate collisions with respect to asynchronous transmissions that do occur, the edge devices can be configured to retry their transmissions after some given delay until they eventually receive an acknowledgement from the base transceiver to indicate reception of that message.)

As noted earlier, these teachings will readily accommodate a frequency-hopping methodology. Such an approach can assist both with security and also with helping to assure that messages are properly conveyed even under challenging temporary or permanent reception conditions.

By one approach, this communications protocol can presume the sequential use of a given number of carriers. For example, fifty different carrier frequencies can serve in this regard. Each network element can be provided with this list to assure that each network element is apprised of the specific frequencies the system is using, and their order of use. This list can be provided at the factory or can be provided, or updated, by the system with which the device becomes affiliated.

By one approach, there can be four such tables. The frequencies identified in these four tables can be mutually exclusive with respect to one another or can overlap to some greater or lesser extent. Each table can, in turn, be associated, for example, with a given network ID as described above. In such a case, then, when a repeater or edge device is assigned a given network ID to use with a given wireless communication system, that network element can then utilize that network ID to also determine which table of carrier frequencies to use when observing the frequency hopping behaviors of the protocol.

Figure 15:
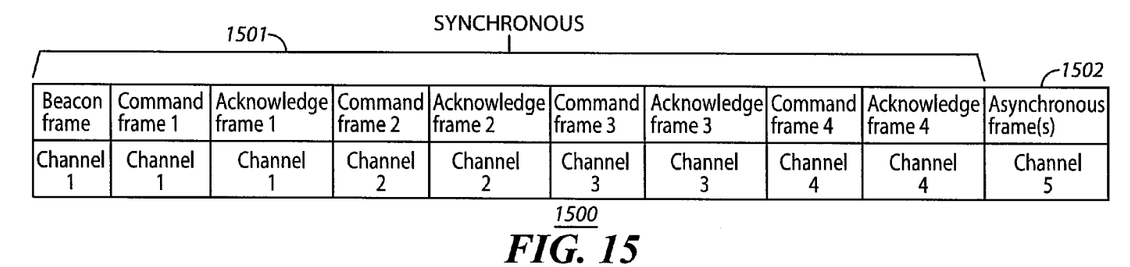
FIG. 15 comprises a schematic frame diagram as configured in accordance with various embodiments of the invention.

Referring now to FIG. 15, this communication protocol can provide for hopping from one frequency to the next as a function of certain frame transitions. As shown, and as a non-limiting example in these regards, during the synchronous portion 1501 of the beacon cycle 1500 the carrier frequency is automatically changed when transitioning from an acknowledgement frame to a command frame and also when transitioning from the synchronous portion 1501 to the aforementioned synchronous portion 1502. Using this approach, then, in this example whatever frequency is associated in the table with "channel 1" is used during the beacon frame and the first command/acknowledge frame pair. The protocol then switches to the next carrier frequency in the pre-established sequence, as represented here by "channel 2."

In this example, a same channel is use throughout the asynchronous portion 1502 of the beacon cycle 1500. This is likely appropriate for many application settings where the asynchronous nature of this portion can mean that edge devices will be uncertain regarding their synchronization state and hence what frequency should be used for their ad hoc asynchronous transmissions if the frequency were to be hopping during this time.

Figure 16:
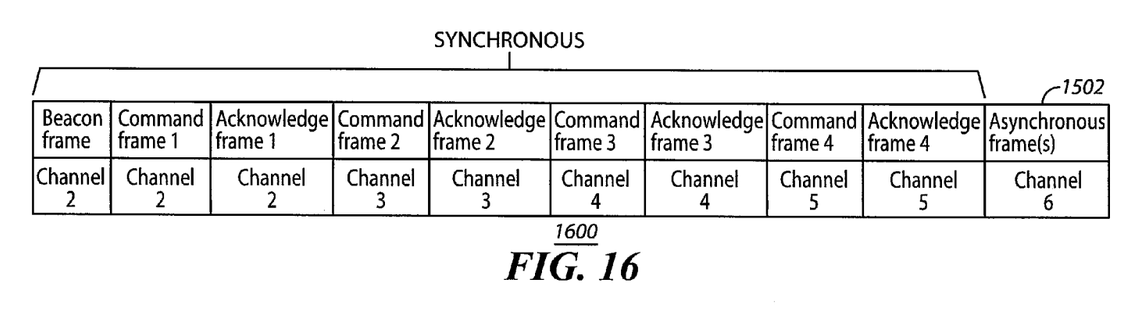
FIG. 16 comprises a schematic frame diagram as configured in accordance with various embodiments of the invention.

By one approach, the initial frequency to use at the beginning of each beacon cycle can represent a precession of the initial frequency as was used at the beginning of the just-previous beacon cycle. By way of illustration, and referring to FIG. 16, a next-subsequent beacon cycle 1600 to the beacon cycle 1500 shown in FIG. 1 can begin with "channel 2" (which is the initial frequency used with the first beacon cycle 1500 incremented by one in the aforementioned table). The frequencies can then increment through the corresponding table as described above.

Figure 17:
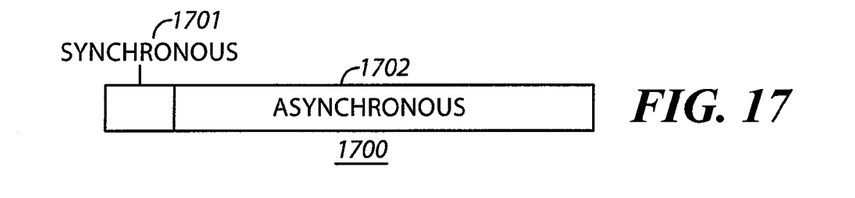
FIG. 17 comprises a schematic frame diagram as configured in accordance with various embodiments of the invention.

By one approach, this asynchronous portion can comprise a relatively large temporal portion of the beacon cycle. For example, by one approach, this asynchronous portion can comprise at least fifty percent of the beacon cycle. As one specific, non-limiting example in these regards, and referring to FIG. 17, the beacon cycle 1700 can comprise about 4 seconds in duration with the asynchronous portion 1702 comprising about 3.57 seconds thereof as compared to a considerably shorter synchronous portion 1701. Using this approach, and generally speaking, as a practical matter most of the time any of the edge devices is free to transmit an ad hoc transmission to alert the controller regarding some corresponding state of concern.

By one approach, these edge devices can be configured to transmit such ad hoc messages in a temporally-redundant fashion that will even permit these devices to spontaneously transmit during the synchronous portion of the beacon cycle. (As one concession in these regards, the edge devices might be configured to avoid making such a transmission at a time coincident with when a beacon transmission is in fact anticipated by the edge device.) Though the base transceiver will typically ignore such a transmission as might occur during this time frame, by spacing the repetitions of this transmission sufficiently at least one of the redundant transmissions will likely occur during the asynchronous portion of the beacon cycle and hence get through to the base transceiver. This might comprise, for example, transmitting each ad hoc message four times at a spacing of 101 milliseconds.

Though the edge devices are free to transmit whenever they wish during the asynchronous portion of the beacon cycle, by one approach the repeaters (as well as the base transceiver) remain true to the previously-described time-slot-based protocol. Accordingly, upon receiving an ad hoc asynchronous transmission from a given edge device, the receiving repeater will buffer that information as necessary to await its next available time slot to transmit a corresponding repetition. As during the synchronous portion of the beacon cycle, such a repeater will then ignore any further received messages until a next frame occurs. It will be appreciated, then, that the previously described unequal time-slot assignment aspect of this protocol has value as well during this asynchronous portion of the beacon cycle, as this has the overall effect of shortening the temporal length of each frame during the asynchronous portion and hence permits the repeaters to reset themselves to be ready to repeat new incoming messages more quickly than might otherwise be expected.

So configured, the system will be able to poll a given edge device (during the synchronous portion of the beacon cycle) about once every four seconds. This is adequate for many application settings such as the described self-storage facility, and particularly so because the system will accept ad hoc transmissions from these edge devices during the greater majority of that four seconds which comprises the asynchronous portion of the beacon cycle. The time-slot-based methodology, in turn, tends to ensure that a given message will make its way through, if necessary, up to four different repeaters in a given frame while nevertheless allocating fewer time slots than might ordinarily be expected to accomplish this result.

To a very large extent, the results are attained in a largely uncentralized manner. While the base transceiver assigns or otherwise agrees to the use of particular system ID's for given repeaters, these network elements are without specific information regarding each others physical location to one another or to the edge devices. Nevertheless, effective repeating paths, dynamically effected on the fly, are inherently accommodated without using, for example, router tables or the equivalent and without requiring an undue allocation of bandwidth.

As noted with respect to the above-described example, there can be a considerable gap in time between beacon messages. As each beacon message will identify only one edge device (or none), for most of the four seconds that the beacon cycle the vast majority of the edge devices can, at the least, power down their transceivers while awaiting the next scheduled beacon message. Given the time durations described above, this reduced duty cycle represents an improvement of around 156 to 1 with respect to improving battery life for the transceiver functionality. This, in turn, makes it far more practical to consider deploying such a system in the first place, as now the battery-replacement activity is necessitated far less frequently.

Figure 18:
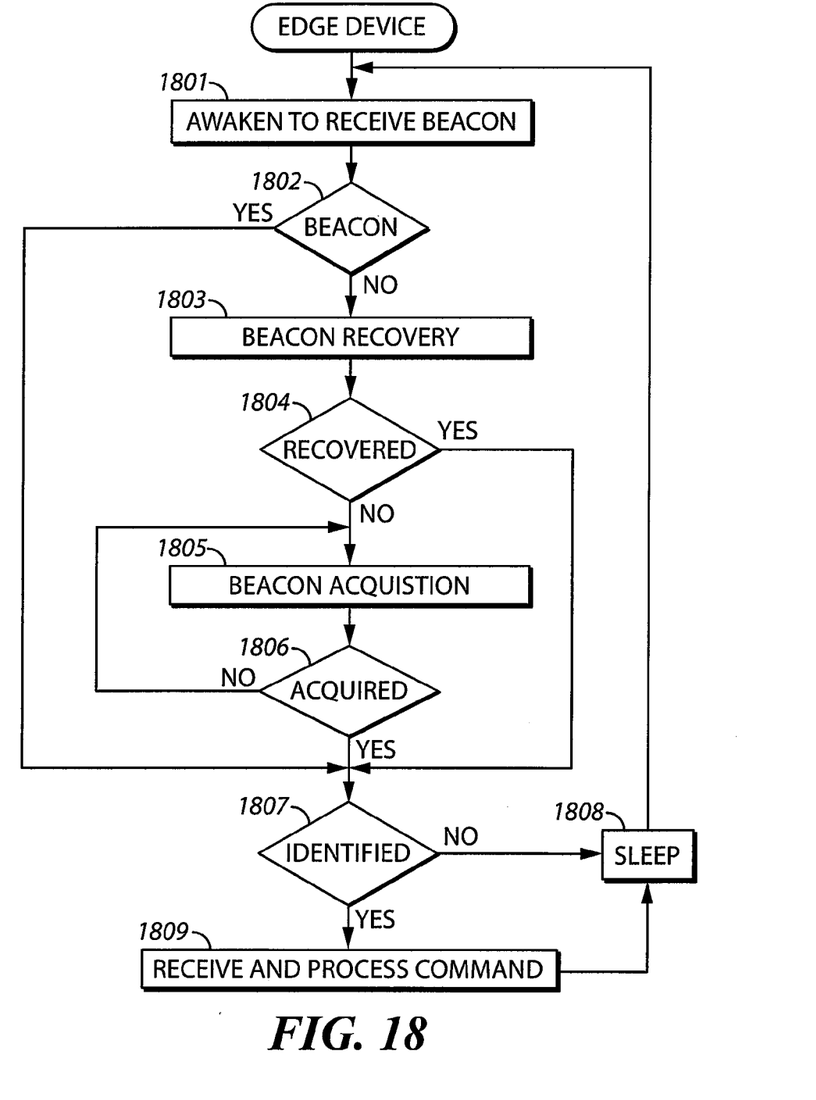
FIG. 18 comprises a flow diagram as configured in accordance with various embodiments of the invention.

To illustrate generally such behavior, and referring now to FIG. 18, when an edge device awakens (from having previously been put to sleep) at step 1801, the edge device can determine at step 1802 whether a beacon message can be detected. This step 1802 presumes that the approximate time to detect the beacon is known. When true, the edge device then determines from the beacon message, at step 1807, whether this particular edge device is identified. If not, the edge device then returns to a sleep state 1808 (by powering down, for example, its transceiver) to await the next anticipated beacon transmission.

When the beacon is not received as expected, the edge device can utilize a beacon recovery mode of operation 1803. This mode of operation presumes that a time slip of some kind has occurred. In this case, the edge device continues to operate using the same presumptions regarding, for example the carrier to use for the next beacon frame, but awakens earlier than its calculations indicate are necessary in order to hopefully recapture and regain synchronicity with the beacon transmissions. If this approach results in detected beacon recovery at step 1804, the edge device then proceeds as described above.

If beacon recovery fails, the edge device can then adopt a beacon acquisition mode of operation 1805. Using this approach, the edge device remains on a given one of the available frequency-hopping frequencies for a duration of time that will accommodate fifty beacon cycles (presuming, as in this example, that there are fifty such carrier frequencies). Given the time frames described herein, this will take about two hundred seconds. If the beacon is acquired, the edge device can proceed as already described previously (presuming that the edge device is already an acknowledged part of this system; if the edge device instead acquires a beacon for a new system, the edge device can conduct a learn session with the base transceiver as described earlier to become an acknowledged part of that system).

If the beacon is not acquired during the described time, the edge device can switch to the next carrier frequency and again await reception of a beacon for a similar amount of time. This process can repeat as needed until all fifty channels have been tested. At that time, if desired, the process can conclude. By one approach, this can represent a temporary termination of the acquisition process. In this case, the edge device can again begin the beacon acquisition some predetermined time later (such as a two hours, one day, one week, or such other period of time as may meet the needs and requirements of a given application setting).

When the received beacon does identify the receiving edge device, at step 1809 the edge device can receive and process the command as appropriate. This can include making a responsive acknowledgement transmission to provide requested information and/or to acknowledge having taken a particular commanded action. Following this activity, the edge device can again revert to the sleep mode of operation 1808.

These teachings are suitable for use with a wide variety of network elements and hence can serve to greatly leverage the value of such elements. These teachings are also highly scalable and can be employed in conjunction with a variety of differently-sized systems characterized by greatly varying differences with respect to the number of edge devices are supported. Generally speaking, such a system can be installed without undue regard being needed with respect to which repeater might be placed where within a given facility. Furthermore, the described teachings are highly self-organizing and permit both an initial installation and subsequent reconfigurations to be made with relative ease and without the constant oversight of highly-skilled and experienced technicians.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method to facilitate repeating messages in a wireless communication system to accommodate a plurality of repeaters, the method comprising:
   providing a pool of identifiers;
   facilitating usage of particular ones of the identifiers by corresponding particular ones of the plurality of repeaters;
   providing a communications protocol to be used by the plurality of repeaters wherein the protocol provides time slots for use by the repeaters to make their transmissions, wherein each of the time slots are associated with individual corresponding ones of the identifiers and wherein the time slots are allocated unequally amongst the identifiers such that at least one of the identifiers has more time slots allocated to that identifier, over a given beacon cycle, than others of the identifiers.

2. The method of claim 1 wherein the communications protocol will simultaneously accommodate a maximum number of X repeaters and wherein the communications protocol establishes a given sub-sequence of X time slots that are equally distributed amongst the maximum number of repeaters.

3. The method of claim 2 wherein the communications protocol further establishes at least one additional sub-sequence of X time slots and comprises, at least in part, a reversal of the given sub-sequence.

4. The method of claim 3 wherein the given sub-sequence of X time slots and the at least one additional sub-sequence of X time slots partially, but not fully, overlap with one another.

5. The method of claim 4 wherein:
   the given sub-sequence of X time slots has an initial time slot correlated to a first one of the identifiers and a concluding time slot correlated to a second one of the identifiers that is different than the first one of the identifiers to form a forward-ordered progression of the time slots; and
   the additional sub-sequence of X times slots has an initial time slot that comprise the concluding time slot of the given sub-sequence of X time slots and a concluding time slot that is correlated to the first one of the identifiers to form a reverse-ordered progression of the time slots.

6. The method of claim 5 wherein the communications protocol further provides, within the beacon cycle:
   a next sub-sequence of X time slots that partially, but not fully, overlaps with the additional sub-sequence of X time slots and wherein the next sub-sequence of X time slots matches the forward-ordered progression of the given sub-sequence of X time slots;
   a following sub-sequence of X time slots that partially, but not fully, overlaps with the next sub-sequence of X time slots and wherein the following sub-sequence of X time slots matches the reverse-ordered progression of the additional sub-sequence of X time slots.

7. The method of claim 6 wherein X equals four.

8. The method of claim 7 wherein there are thirteen unique, discrete time slots that comprise, in sum total over the beacon cycle, the time slots that comprise the given sub-sequence, the additional sub-sequence, the next sub-sequence, and the following sub-sequence of time slots.

9. A method comprising:
   correlating each of a plurality of wireless repeaters to a corresponding unique identifier;
   establishing a non-repeating order of the unique identifiers to provide a sequence of identifiers;
   for a cyclical signaling opportunity having a plurality of time slots to be assigned for use by the wireless repeaters, sequentially assigning each of the time slots within a given sequence of the time slots to a corresponding one of the unique identifiers by tracking the sequence of unique identifiers followed in a partially over-lapping manner by tracking the sequence of unique identifiers in a reversed order.

10. The method of claim 9 wherein the time slots assigned by tracking the sequence of unique identifiers overlap with the time slots assigned by tracking the reversed order of the sequence of unique identifiers by one time slot.

11. The method of claim 10 further comprises, for the cyclical signaling opportunity, sequentially assigning the time slots within a second sequence of the time slots, which second sequence partially overlaps with the given sequence of the time slots, to a sequence of unique identifiers that matches the sequence of unique identifiers for the given sequence of the time slots.

12. The method of claim 11 wherein the given sequence of time slots overlap with the second sequence of time slots by one time slot.

13. A method to facilitate using a carrier to transmit a message from a message source to a message destination via a plurality of repeaters that each have a unique identifier, wherein the repeaters each observe a shared protocol that provides time slots for use by the repeaters to make their transmissions, wherein each of the time slots are associated with individual corresponding ones of the identifiers and wherein the time slots are allocated unequally amongst the identifiers such that at least one of the identifiers has more time slots allocated to that identifier, over a given beacon cycle, than others of the identifiers, the method comprising:
   at the message source:
      providing a message to be transmitted to the message destination;
      using the carrier to transmit the message asynchronously with respect to the time slot allocations and regardless of whether the message may occupy at least one of the time slots and may collide with a repeater's transmission in such a time slot.

14. A wireless repeater to facilitate repeating messages in a wireless communication system, the wireless repeater comprising:
   a wireless transceiver;
   a memory having an identifier stored therein, wherein the identifier comprises one of a plurality of identifiers that are each uniquely correlated to a corresponding one of a plurality of repeaters in the wireless communication system;
   a control circuit operably coupled to the memory and the wireless transceiver and configured to use a communications protocol to transmit repeated messages, which communications protocol provides time slots for use by the plurality of repeaters to make their transmissions, wherein each of the time slots are associated with individual corresponding ones of the identifiers and wherein the time slots are allocated unequally amongst the identifiers such that at least one of the identifiers has more time slots allocated to that identifier, over a given beacon cycle, than others of the identifiers.

15. The wireless repeater of claim 14 wherein at least one of the messages comprises a message that has already been repeated by at least one of the plurality of repeaters.

16. A wireless repeater to facilitate repeating messages in a wireless communication system, wherein the wireless repeater comprises one of a plurality of repeaters within the wireless communication system and wherein at least one of the plurality of repeaters has more allocated time slots over a given beacon cycle than at least one other of the plurality of repeaters, the wireless repeater comprising:
   a memory having a repeater identifier stored therein;
   a control circuit that is operably coupled to the memory and that is configured to utilize the repeater identifier to determine which time slots are allocated to the wireless repeater when repeating the messages within the wireless communication system.

17. The wireless repeater of claim 16 wherein the repeater identifier comprises a wireless communication system-assigned repeater identifier.

18. A method to facilitate using a carrier to transmit a message from a message source to a message destination via a plurality of repeaters that each have a unique identifier, wherein the repeaters each observe a shared protocol that provides time slots for use by the repeaters to make their transmissions, wherein each of the time slots are associated with individual corresponding ones of the identifiers and wherein the time slots are allocated unequally amongst the identifiers such that at least one of the identifiers has more time slots allocated to that identifier, over a given beacon cycle, than others of the identifiers, the method comprising:
   at the message source:
      providing a message to be transmitted to the message destination;
      using the carrier to transmit, within a particular beacon cycle, the message synchronously with respect to the time slot allocations allowing for utilization of the repeaters within the particular beacon cycle after transmission of the message.

* * * * *